United States Patent [19]

Fujimoto et al.

[11] Patent Number: 5,303,465
[45] Date of Patent: Apr. 19, 1994

[54] METHOD OF ASSEMBLING PISTON RING AND METHOD OF ASSEMBLING SET OIL RING AND APPARATUS FOR ASSEMBLING SET OIL RING

[75] Inventors: Shuzo Fujimoto; Hiroshi Ejiri; Yuji Tamai; Satoshi Takahashi; Naofumi Nagata, all of Sayama, Japan

[73] Assignee: Honda Giken Kogyo Kabushiki Kaisha, Tokyo, Japan

[21] Appl. No.: 49,454

[22] Filed: Apr. 20, 1993

[30] Foreign Application Priority Data

| Apr. 27, 1992 | [JP] | Japan | 4-108169 |
| Apr. 27, 1992 | [JP] | Japan | 4-108171 |
| Dec. 8, 1992 | [JP] | Japan | 4-328238 |

[51] Int. Cl.$^5$ .................................. B23P 15/00
[52] U.S. Cl. .................................. 29/791; 29/222; 29/783; 29/888.044
[58] Field of Search .................. 29/222, 223, 224, 783, 29/791, 809, 888.044

[56] References Cited

U.S. PATENT DOCUMENTS

| 3,754,312 | 8/1973 | Komorek | 29/222 |
| 3,793,695 | 2/1974 | Carter | 29/222 |
| 4,047,276 | 9/1977 | Albers | 29/222 |
| 4,967,459 | 11/1990 | Garnier | 29/222 |

FOREIGN PATENT DOCUMENTS

| 0201001 | 6/1983 | Fed. Rep. of Germany | 29/222 |
| 57-22696 | 5/1982 | Japan . | |
| 0194841 | 11/1982 | Japan | 29/791 |
| 58-2020 | 1/1983 | Japan . | |
| 61-16020 | 5/1986 | Japan . | |
| 61-19376 | 5/1986 | Japan . | |
| 63-150119 | 6/1988 | Japan . | |
| 63-196328 | 8/1988 | Japan . | |
| 4-189429 | 7/1992 | Japan | 29/791 |
| 1450004 | 1/1989 | U.S.S.R. | 29/783 |
| 366319 | 2/1932 | United Kingdom . | |

Primary Examiner—Irene Cuda
Attorney, Agent, or Firm—Armstrong, Westerman, Hattori, McLeland & Naughton

[57] ABSTRACT

A piston ring is assembled into a groove of a piston by pushing the piston ring out of a front end of a guide member. The piston ring is mounted on an outside of the guide member which has a diameter larger than an outside diameter of the piston. The pushing is carried out while maintaining a clearance which allows for the piston ring to undulate. This clearance is formed between a front end of the guide member and a plane including a groove surface which lies away from the front end of the guide member. The apparatus for assembling a set oil ring into a piston ring groove of a piston has a guide member which is larger in diameter than an outside diameter of the piston, pushing device for pushing, in sequence out of a front end of the guide member, a spacer ring and a pair of side rail rings, a restricting member which is movable back and forth in a radial direction of the guide member and which can be placed with a clearance to be formed to open into that groove portion which is formed between that groove surface of the piston ring groove which is closer to the guide member and the spacer ring assembled into the piston ring groove.

9 Claims, 12 Drawing Sheets

METHOD OF ASSEMBLING PISTON RING AND METHOD OF ASSEMBLING SET OIL RING AND APPARATUS FOR ASSEMBLING SET OIL RING

BACKGROUND OF THE INVENTION

The present invention relates to such a method of assembling a piston ring as is applied to the assembling of a thin piston ring, and to a method of assembling a set oil ring comprising a spacer ring and a pair of side rail rings into a piston ring groove of a piston, as well as to an apparatus for assembling a set oil ring.

Conventionally, in assembling the set oil ring, the spacer ring is first assembled into the piston ring groove and then each side rail ring is assembled into each groove portion to be formed between the spacer ring and the upper groove surface and the lower groove surface, respectively, of the piston ring groove.

The assembling of this kind of spacer ring and the side rail rings is conventionally carried out, as disclosed in Japanese Published Examined Patent Application No. 2020/1983 and Japanese Published Examined Patent Application No. 19376/1986, Japanese Published Examined Utility Model Registration Application No. 16020/1986, and others, by positioning or aligning, relative to the piston, a guide member having a larger diameter than the outside diameter of the piston, and then pushing the rings mounted on the external periphery of the guide member out of the front end thereof. As the guide member, there are provided three kinds for the spacer ring, the upper-side side rail ring and the lower-side side rail ring. A corresponding guide member is thus used in each of the different assembling stations to independently assemble the spacer ring and the upper-side side rail ring and the lower-side side rail ring.

For example, in assembling the lower-side side rail ring into the groove portion between the spacer ring and the lower-side groove surface, there will be used a guide member whose lower end coincides with the upper surface level of the groove portion. There will then be disposed, under the guide member, a restricting member which faces the guide member with a clearance which is slightly larger than the thickness of the side rail ring. The side rail ring which is mounted on a periphery or external surface of the guide member is pushed out of the lower end of the guide member to thereby assemble the side rail ring into the groove portion through the clearance between the guide member and the restricting member.

Such a thin ring as the side rail ring has a smaller rigidity in the direction of its thickness and, therefore, it is likely to be bent to form undulations in the direction of its thickness when it is expanded in diameter by inserting it into the external surface of the guide member. As a solution, in the above-described prior art, a restricting member is oppositely disposed under the guide member, and the clearance between the two members is set to a size which is equal to the thickness of the side rail ring added by a small clearance to allow for the side rail ring to pass therethrough. It is thus so arranged that the undulations of the side rail ring are corrected while it passes through this clearance.

In this method, however, it is necessary to strictly control the amount of the clearance between the guide member and the restricting member in accordance with the thickness of the side rail ring, as well as to strictly control the relationship of the clearance to the piston so that the clearance is in right opposite the ring assembling position of the piston. As a result, due to high requirements of accuracy of positioning the guide member relative to the piston, the equipment becomes complicated and expensive.

OBJECTS AND SUMMARY OF THE INVENTION

In view of the above-described disadvantages, the present invention has an object of providing a method of assembling a piston ring in which, by positively utilizing the undulating phenomena of the piston ring, the piston ring can be assembled into the groove portion of the piston without the necessity of accurately positioning the guide member relative to the piston.

Further, in the above-described conventional methods of assembling the set oil ring, there are provided three stages of longitudinally disposed assembling stations for the spacer ring, the upper-side side rail ring and the lower-side side rail ring. Therefore, it has a disadvantage in that the length of the assembling line becomes long with consequent high equipment costs. Therefore, the present invention has another object of enabling to assemble the spacer ring and a pair of side rail rings in a single assembling station with a common guide member by positively utilizing the undulating phenomena of the side rail rings.

According to the present invention, the foregoing and other objects are attained by a method of assembling a piston ring into a groove portion of a piston by pushing it out of a front end of a guide member, the piston ring being mounted on an outside of the guide member which has a diameter larger than an outside diameter of the piston, wherein the above-described pushing is carried out while maintaining a clearance which allows for the piston ring to undulate, the clearance being formed between a front end of said guide member and a plane including a groove surface which lies away from the front end of the guide member.

According to the present invention, the clearance for allowing the undulations of the piston ring is secured in front of the guide member. Therefore, when the piston ring is pushed out of the front end of the guide member, the piston ring is undulated and those undulated portions of the piston ring which project in front of the guide member will reach a position which faces the groove portion of the piston. Then, when the piston ring has completely been pushed out of the front end of the guide member, the remaining portion of the piston ring is pulled, with the undulated portions functioning as origins, into the groove portion of the piston due to the elastic force of restoration of the piston ring. The piston ring is thus assembled into the groove portion.

Even if the position where the front ends of the undulated portions of the piston ring reach may slightly exceed the plane or surface including the groove surface which is far from the front end of the guide member, intermediate parts of the undulated portions will engage into the groove portion through contraction of the piston ring by pushing it out of the guide member. With these parts functioning as origins, the piston ring will be pulled into the groove portion. Therefore, even if the position of the guide member relative to the piston may slightly deviate, the piston ring can be engaged into the groove portion of the piston.

If the positions where the undulated portions reach largely exceed the above-described surface, there may occur a failure in assembling the piston ring. Therefore, it is preferable to provide a restricting member on substantially the same level as the above-described surface to restrict the position where the undulated portions reach, by means of the restricting member.

According to another aspect of the present invention, a method of assembling a set oil ring into a piston ring groove of a piston, the set oil ring comprising a spacer ring and a pair of side rail rings to be placed on both sides of the spacer ring comprises the steps of: positioning a guide member, which is larger in diameter than an outside diameter of the piston, such that a front end of the guide member is in a predetermined positional relationship with the piston ring groove; mounting, before or after the above-described step, the spacer ring and the pair of side rail rings into an outside of the guide member such that the spacer ring is positioned in a foremost side towards the front end of the guide member, followed by the pair of side rail rings; assembling the spacer ring into the piston ring groove by pushing it out of a front end of the guide member; assembling, by pushing out of the front end of the guide member, the front-side side rail ring which lies on the front end of the pair of side rail rings, into a groove portion which is formed between the spacer ring and that groove surface of the piston ring groove which is closer to the guide member, the assembling being made in a condition in which, after assembling of the spacer ring, a restricting member is positioned ahead of the guide member while leaving a clearance which opens into the groove portion; and assembling, by pushing out of the front end of the guide member, the rear-side side rail ring which lies on the rear side, out of the pair of the side rail rings, into a groove portion which is formed between the spacer ring and that groove surface of the piston ring groove which is far from the guide member, the assembling being made in a condition in which the restricting member is retreated to secure a clearance, which allows for an undulation of the rear-side side rail ring, between a plane including that groove surface of the piston ring groove which lies far from the front end of the guide member and the front end of the guide member.

According to still another aspect of the present invention, an apparatus is provided for assembling a set oil ring into a piston ring groove of a piston. The set piston ring comprises a spacer ring and a pair of side rail rings to be placed on both sides of the spacer ring. This apparatus comprises: a guide member which is larger in diameter than an outside diameter of the piston, a front end of the guide member being able to be positioned relative to the piston into a predetermined positional relationship with the piston ring groove, the guide member being able to mount on an outside thereof the spacer ring and the pair of side rail rings such that the spacer ring is positioned in a foremost side towards a front end of the guide member, followed by the pair of side rail rings; pushing means for pushing, in sequence out of the front end of the guide member, the spacer ring and the pair of side rail rings; and a restricting member which is movable back and forth in a radial direction relative to the guide member and which can be placed, relative to the front end of the guide member, with a clearance to be formed to open into that groove portion which is formed between that groove surface of the piston ring groove which is closer to the guide member and the spacer ring assembled into the piston ring groove.

After the guide member has been aligned onto the piston, the pushing means is operated to, first, push the spacer ring out of the front end of the guide member, thereby assembling it into the piston ring groove. Then, the side rail ring which lies on the front side, out of the pair of the side rail rings, is pushed out. At this time, the restricting member is positioned ahead of the guide member with a clearance. According to this arrangement, the above-described side rail ring is assembled, through the above-described clearance, into the groove portion which is formed between the spacer ring and that groove surface of the piston ring groove which lies closer to the front end of the guide member. Finally, the rear-side side rail ring is pushed out in a condition in which the restricting member is retreated radially outwards. At this time, since the side rail ring is not subject to restriction from an axially front end, it will undulate as shown in FIGS. 8(a) through 8(c). As a result, the undulated portions which project in an undulating manner towards the front of the guide member will reach positions which face the groove portion to be formed between the spacer ring and that groove surface of the piston ring groove which lies far from the front end of the guide member. Therefore, when the rear-side side rail ring has been completely pushed out of the guide member, the remaining portion of the side rail ring is pulled, with the above-described undulated portions functioning as origins, or starting points, into the groove portion due to the elastic restoring force of the side rail ring. The side rail ring is thus assembled into the groove portion. Since there is a possibility that the assembling into the groove portion may fail if the positions in which the undulated portions reach largely exceed the above-described position which faces the groove portion, it is preferable to dispose a second restricting member on substantially the same level as the groove surface which lies far from the front end of the guide member, to receive the rear-side side rail ring which is pushed out of the guide member.

Since the side rail rings are very thin, there is a possibility that the side rail rings are also pushed out when the spacer ring is pushed out. In such a case, a clearance is provided between the spacer ring and the front-side side rail ring, out of the pair of side rail rings. The restricting member is arranged to be movable in an axial direction of the guide member. Through the axial movement and the radial movement of the restricting member, the restricting member is interposed into the space or clearance between the spacer ring and the front-side side rail ring. In this condition, the restricting member is moved axially towards the front of the guide member, thereby pushing out the spacer ring. It becomes thus possible to prevent the side rail rings from being pushed out together with the spacer ring. Further, after the spacer ring has been pushed out, the restricting member can be moved to a position facing the front end of the guide member while maintaining the above-described clearance, thereby making it ready for the assembling of the front-side side rail ring. The working efficiency can therefore be improved.

In this case, there is provided a pushing member which abuts the rear-side side rail ring and which is movable in the axial direction of the guide member so that the pushing member and the restricting member together constitute the pushing means. In this arrangement, it is possible to axially move the restricting member by a driving source which is different from the one for the pushing member. However, if an arrangement is made such that the restricting member is urged rearwards in the axial direction of the guide member and that one of the restricting member and a front end of the pushing member is provided, in a projecting manner, with an abutment piece which abuts the other thereof thereby pushing the restricting member by the pushing member forwards in the axial direction of the guide member, it is advantageous in that the driving source for the restricting member is not necessary. In this case, if an arrangement is made to meet the formulae $0 \leq A < t/2$ and $2t/ < B < 2t + t/2$, where A is a distance in the axial direction between the front end of the guide member and that groove surface of the piston ring groove which is closer to the guide member, B is the projecting length of the abutment piece, and t is a thickness of the side rail ring, it becomes possible, when the front-side side rail ring is pushed out, to maintain a clearance between the front end of the guide member and the restricting member, the clearance being sufficient for the front-side side rail ring to pass therethrough, on condition that the position of axially forward movement of the restricting member is adequately restricted by a stopper or the like. At the same time, it is also possible to cause the restricting member to function as a stopper against the pushing member to thereby securely prevent the rear-side side rail ring from being pushed out.

When the front-side side rail ring is assembled into the piston ring groove, there is a possibility that both ends of the split portion of the spacer ring are overlapped accompanied by a pull due to contraction of the side rail ring. In such a case, if a radially inner surface of the restricting member is arranged to face both ends of the split portion of the spacer ring, and the distance from a center of the piston to the radially inner surface of the restricting member is made smaller than an outside diameter of the split portion with both ends thereof being overlapped, the overlapping of both ends of the split portion can be prevented through their interference with the radially inner surface. Further, if an engaging piece is provided in that surface of the restricting member which faces an axially forward end of the guide member such that the engaging piece engages into the clearance between both ends of the split portion of the spacer ring which is mounted on the guide member, both ends of the split portion of the spacer ring can be prevented from being overlapped when the spacer ring is pushed out of the guide member.

It is free to choose which of the following steps shall be carried out first, the step of setting the guide member into the piston or the step of mounting the rings to the guide member. There may, however, be provided a setting jig which can be mounted onto, and pulled out of, the piston for setting the guide member onto the piston while supporting it. Further, the setting jig is arranged to be circulated among the spacer ring feeding station, the side rail ring feeding station, and the assembling station in which the pushing member and the restricting member are disposed. According to this arrangement, after the spacer ring and the side rail rings have been mounted on the guide member on the setting jig in each of the feeding stations, it is possible to set the guide member onto the piston in the assembling station by moving the setting jig so as to be externally inserted onto the piston. It is thus possible to automate all the steps including the step of setting the guide member. Further, it is possible to detach the guide member off the piston by the setting jig after the step of assembling the rings, to discharge the piston out of the assembling station and to circulate the guide member into each of the feeding stations. It is thus possible to prepare for the assembling work of the rings to the next piston to be transported into the assembling station. It follows that the assembling work can be carried out efficiently while reducing the number of guide members to be used.

In this case, if an arrangement is made such that the setting jig is supported by a supporting frame which is circulated among the spacer ring feeding station, the side rail feeding station, and the assembling station in such a manner that the setting jig is urged away from the piston, and that the setting jig is pushed to move towards the piston side by the pushing means, a driving power source exclusively for inserting and pulling the setting jig onto or out of the piston is not required. This arrangement contributes to a simplified construction and a further reduction of the equipment costs.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 8(a) through FIG. 8(c) are views showing the conditions of the side rail ring just before it is pushed out of the guide member, wherein FIG. 8(a) is a perspective view thereof, FIG. 8(b) is a front view thereof and FIG. 8(c) is a side view thereof;

FIG. 12(a) and FIG. 12(b) are sectional views taken along the line XII—XII in FIG. 10, wherein FIG. 12(a) shows a condition before the setting jig is pushed down, and FIG. 12(b) shows a condition when the setting jig is pushed down;

DETAILED DESCRIPTION OF PREFERRED EMBODIMENTS

Figure 14A:
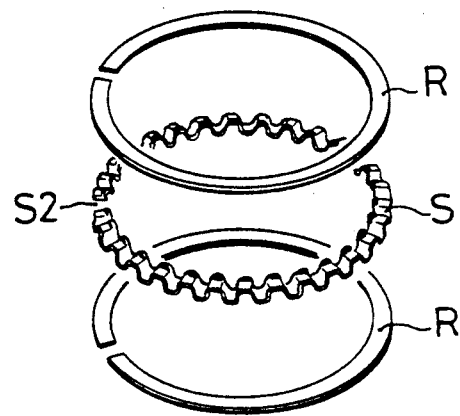
FIG. 14(a) is an exploded perspective view of a set oil ring.
Figure 14B:
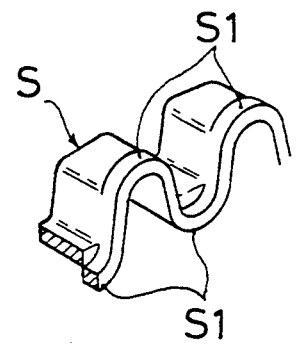
FIG. 14(b) is an enlarged perspective view of part of a spacer ring.
Figure 14C:
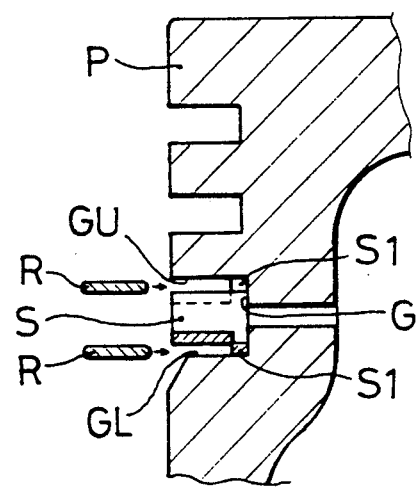
FIG. 14(c) is a sectional view showing the assembled and assembling condition of the set oil ring.

The embodiment as illustrated is for assembling a set oil ring comprising, as shown in FIG. 14(a), a spacer ring S and a pair of side rail rings R which are to be placed on the upper side and the lower side, respectively, of the spacer ring S, into a piston ring groove G which is on the third stage from the top of a piston P. The spacer ring S is formed, as shown in FIG. 14(a), by bending it into a wave form in the peripheral direction. On an internal side portion of each of the upward and downward tip portions of the waves, there is formed, as shown in FIG. 14(b), a small projection S1 so that, when the spacer ring S is assembled into the piston ring groove G, there is secured, as shown in FIG. 14(c), a groove portion GU, GL between the spacer ring S and an upper surface and a lower surface, respectively, of the spacer ring groove G. The upper-side side rail ring R and the lower-side side rail ring R are thus assembled into the respectively groove portions GU, GL.

Figure 1:
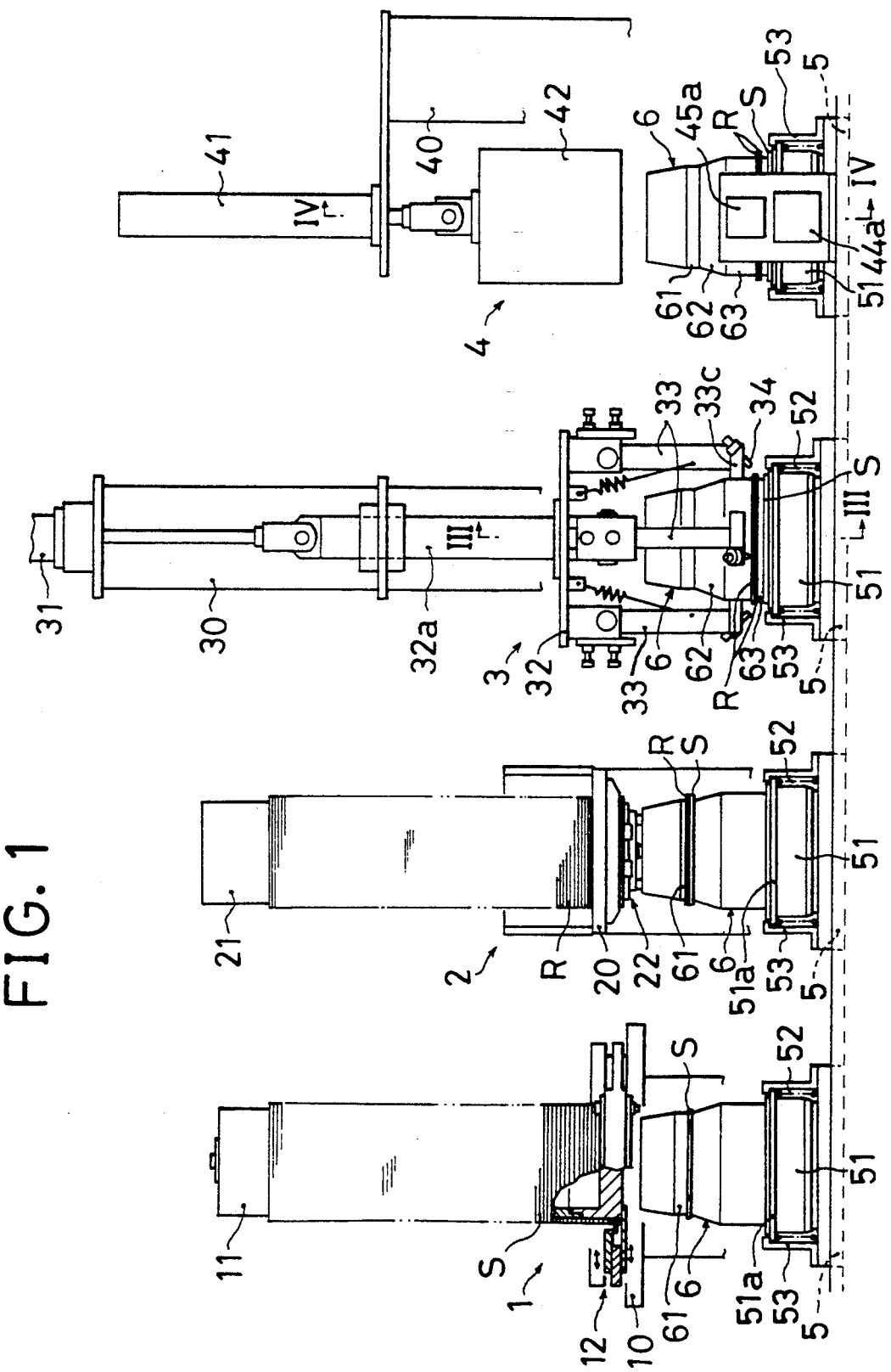
FIG. 1 is a front view of one example of an assembling line equipped with an assembling apparatus according to the present invention.
Figure 2:
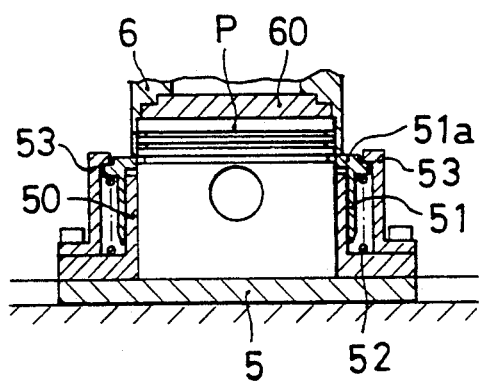
FIG. 2 is a sectional front view showing a condition in which a piston and a guide member are set on a transporting pallet.

FIG. 1 shows an assembling line for assembling the set oil ring. From a starting end downwards, there are disposed in the order mentioned a spacer ring feeding station 1, a side rail ring feeding station 2, a ring separating station 3 and a ring assembling station 4. A piston P is set in an upward looking posture, as shown in FIG. 2, by fitting it into a cylindrical jig 50 on a pallet 5 which is fed by tact movement along the assembling line. A guide member 6 whose diameter is larger than the outside diameter of the piston P is fit or externally inserted onto the piston P from above. In this condition the piston P is transported in sequence through each of the above-described stations 1 through 4.

The guide member 6 is provided on its inner bottom portion with a base plate 60 which abuts the upper surface of the piston P. The guide member 6 is set in position on the piston P such that the lower end thereof is on the same level as the upper side groove surface of the piston ring groove G. A sleeve 51 which has an upper end flange 51a to be interposed between the upper end of the jig 50 and the lower end of the guide member 6, is inserted into an outside of the jig 50 while urging the sleeve 51 upwards by a spring 52. The upward movement of the sleeve 51 is restricted by stoppers 53 which are vertically provided on both sides of the jig 50, at a position in which the upper end flange 51a abuts the lower end of the guide member 6.

In the assembling line the following arrangements have been made. Namely, in the spacer ring feeding station 1, one of the spacer rings S held in a stacked manner by a magazine 11 which is vertically provided on a frame 10 above the assembling line, is caused to be dropped into a small-diameter portion 61 of the guide member 6 by means of a feeding mechanism 12 comprising a pair of upper and lower shutters which are provided in the frame 10. Then, in the side rail ring feeding station 2, two pieces of side rail rings R held in a stacked manner by a magazine 21 which is vertically provided on a frame 20 above the assembling line, are caused to be dropped in sequence into the small-diameter portion 61 of the guide member 6 by means of a feeding mechanism 22 which is provided at the lower surface of the frame 20. Thereafter, in the ring separating station 3, the spacer ring R and the two pieces of the side rail rings R, R are pushed downwards, while being enlarged in diameter, into a lower end large-diameter portion 63 via an intermediate tapered portion 62 of the guide member 6. At the same time, the spacer ring S and the side rail rings R, R are separated from each other to provide a space or clearance in between.

Figure 3:
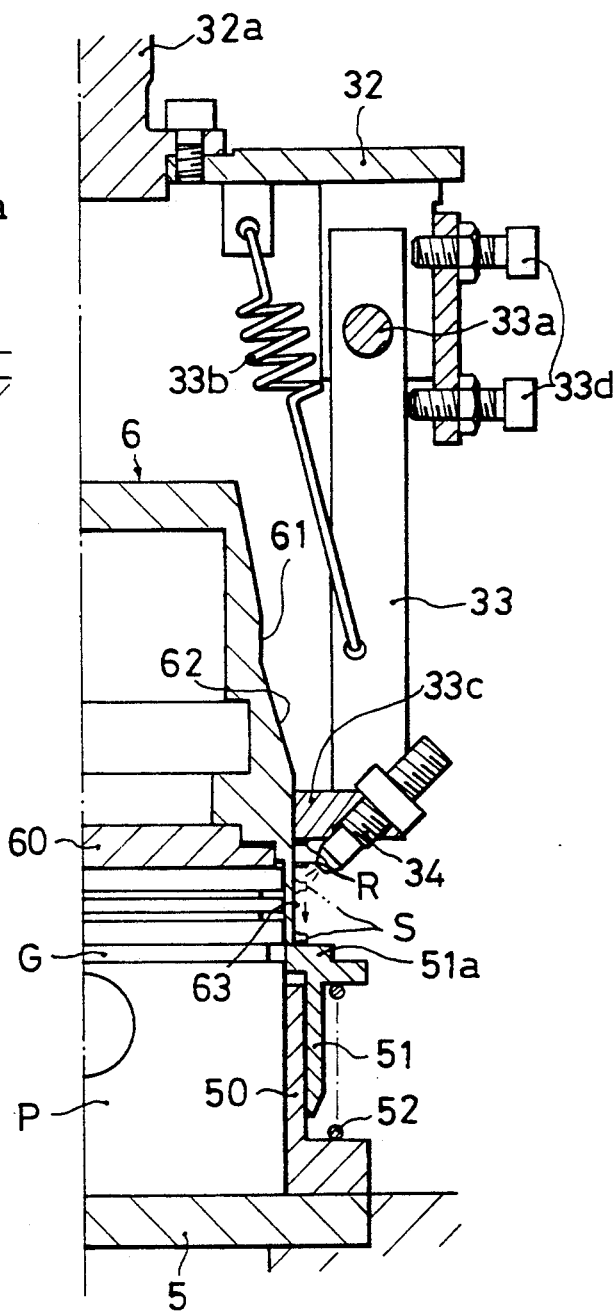
FIG. 3 is a sectional view of an important portion of a ring separating station taken along the line III—III of FIG. 1.

In more detail, in the above-described ring separating station 3, there is provided a movable frame 32 which is moved up and down by a cylinder 31 via a rod 32a which is vertically provided on a frame 30 above the assembling line. A plurality, e.g., 4 pieces, of arm-like pushing members 33 which extend in the vertical direction so as to surround the guide member 6 are vertically provided on a lower surface of the movable frame 32 such that, as clearly shown in FIG. 3, each pushing member 33 is radially swingable about a shaft 33a at its upper end and is urged radially inwards by a spring 33b. An abutment piece 33c which abuts the periphery of the guide member 6 is provided at the lower end of each arm 33. It is thus so arranged that, with the lowering of the movable frame 32, the abutment pieces 33c abut the upper-side side rail ring R and, consequently, that this ring R and the remaining side rail ring R which lies thereunder as well as the spacer ring S which lies further thereunder are pushed downwards into the large-diameter portion 63 via the tapered portion 62. In the Figure, numeral 33d denotes a pair of stopper bolts which are provided near the swinging portion of each arm 33 to restrict the swinging range of the arm 33.

In each of the pushing member 33 there is provided an air nozzle 34 which is inclined radially inwards and downwards so that air jet can be supplied therefrom while the movable frame 32 is going down or after it has gone down. Here, since each side rail ring R is thin and has a small rigidity in the direction of its thickness, it tends to bend, with the enlargement of its diameter, to slightly undulate in the direction of its thickness. As a result, clearances will occur between the upper and the lower side rail rings R, R as well as between the lower-side side rail ring R and the spacer ring S due to undulations. The air from the air nozzles 34 is thus blown into the clearance between the lower-side side rail ring R and the spacer ring S. Since the spacer ring S is bent into a waved form as described above, it is small in the force of contraction. Therefore, only the spacer ring S is blown downwards by the air from the air nozzle 34. As a consequence, the clearance between the lower-side side rail ring R and the spacer ring S becomes larger. The spacer ring S will not be dropped out of engagement with the guide member 6 because the flange 51a on the upper end of the sleeve 51 which is inserted on the outside of the jig 50 is in abutment with the lower end of the guide member 6.

Figure 4:
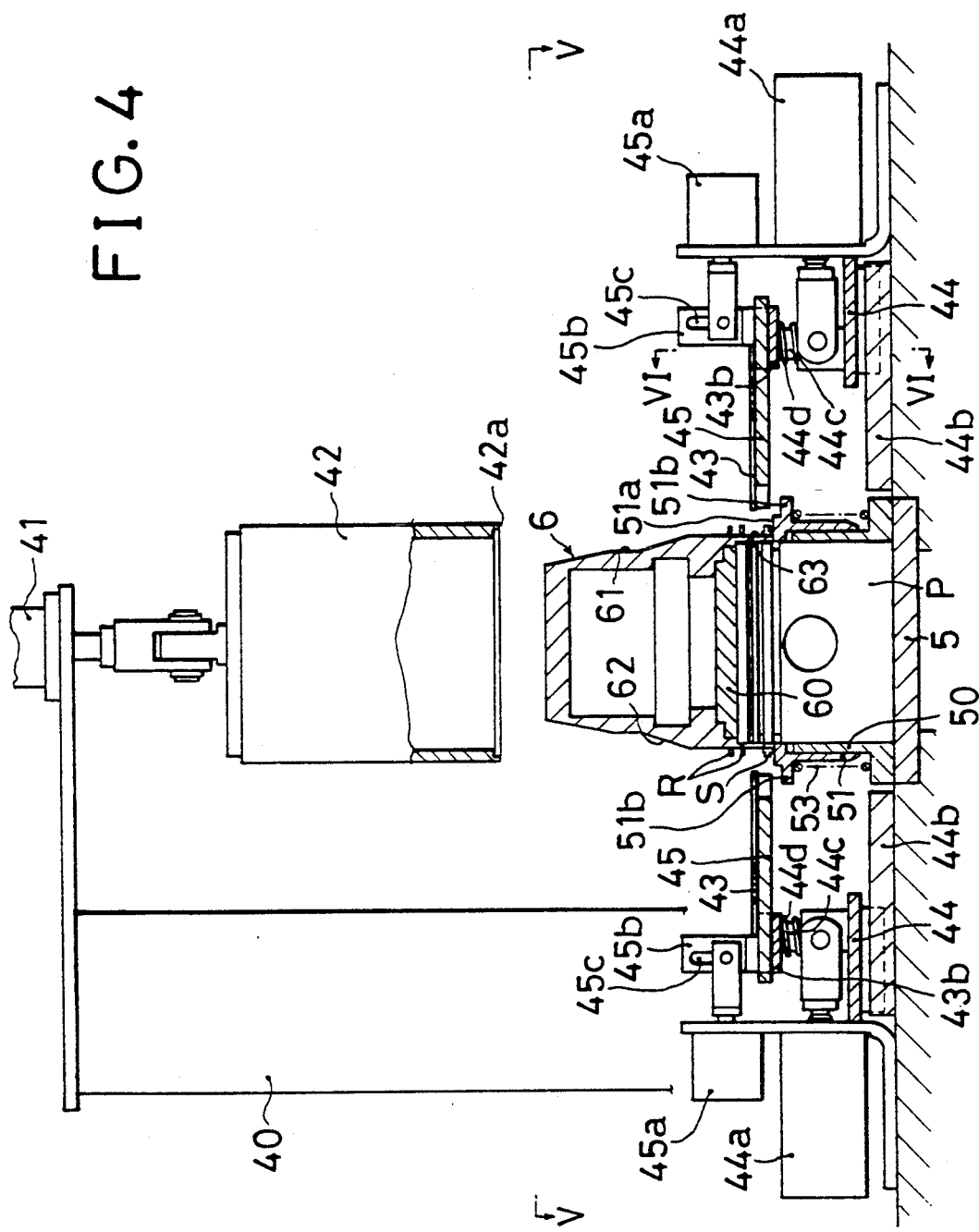
FIG. 4 is a sectional view of a ring assembling station taken along the line IV—IV in FIG. 1.
Figure 5:
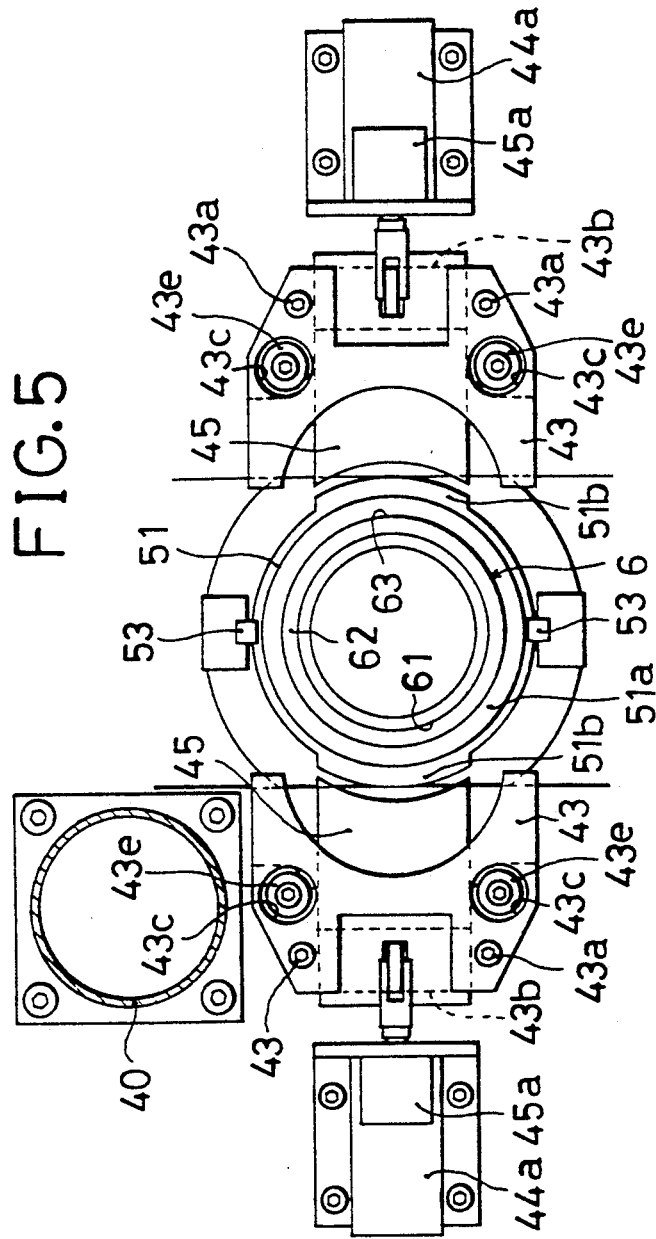
FIG. 5 is a plan view viewed from the line V—V in FIG. 4.
Figure 6:
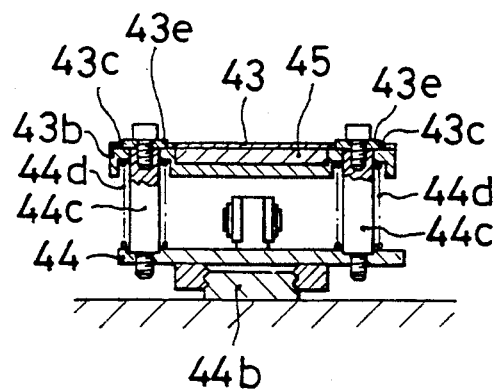
FIG. 6 is a sectional view taken along the line VI—VI in FIG. 4.

In the ring assembling station 4, there are provided, as shown in FIGS. 4 and 5, a downward looking cup-shaped pushing member 42 which is movable up and down by a cylinder 41 vertically provided on a frame 40 above the assembling line and which can be inserted into the outside of the guide member 6, and a pair of restricting members 43, 43 which can be inserted into the clearance, made in the separating station, between the lower-side side rail ring R and the spacer ring S and which can be moved radially back and forth as well as up and down. Each of the restricting members 43 is made by a flat plate with a radially inward end being dented in an arcuate manner. A supporting frame 43b which is fixed with screws 43a to an external lower surface of each restricting member 43 is supported, as shown in FIG. 6, on a movable frame 44 which is moved radially back and forth by a cylinder 44a along a guide rail 44b. Each restricting member 43 is thus made to be movable up and down along a pair of guide bars 44c, 44c which are provided on the movable frame 44 and are urged upwards by springs 44d which are inserted into the outside of the guide bars 44c. The upward movement of each supporting frame 43b is restricted by a washer 43e which is fixed by bolts at the top of each guide bar 44c inside a perforation 43c formed in the restricting member 43. The restricting member 43 is thus made to be normally held at a level which faces the clearance between both of the above-described rings R, S.

Each supporting frame 43b is provided in its central portion with a downward dent, and a sleeve operating plate 45 is interposed in a space between the supporting frame 43b and the restricting member 43 so as to be movable radially back and forth. A piston rod of a cylinder 45a which is parallelly provided above the cylinder 44a is engaged by a pin with a vertically elongated slot 45c which is formed in a vertically rising piece 45b on an external end of the sleeve operating plate 45. The sleeve operating plate 45 is thus arranged to be movable up and down together with the restricting member 43 and also be independently movable radially back and forth. The sleeve operating plate 45 is accordingly made to be changed over between an operating position, through a radially forward movement thereof, which faces an upper side of a stepped extension portion 51b which extends from an outer edge of the flange 51a at an upper end of the sleeve 51 and a clearing position, through radially backward movement thereof, which is off the extension portion 51b. In a periphery of the flange 51a on the inside of the extension portion 51b, there is formed, as clearly shown in FIGS. 7(a) through 7(e), a stepped surface 51c which is made lower by the thickness of the side rail ring R.

On a lower end of the pushing member 42, there is provided, in a projecting manner, an abutment piece 42a which can abut the restricting member 43 at an outer portion which does not come into abutment with the side rail ring R. The projecting length B of this abutment piece 42a is set to be $2t/<B<2t+t/2$, where t is the thickness of the side rail ring R. The vertical distance between the lower end of the guide member 6 and the upper groove surface of the piston ring groove G, which is defined to be A, is set to be $0 \leq A < t/2$.

Next, the assembling procedures in the assembling station 4 will now be explained with reference to FIG. 7.

(In part of the following descriptions, the restricting members 43 and sleeve operating plates 45 are respectively represented in a singular form for the purpose of simplification or clarification, but actually they are respectively provided in a pair as clearly shown in FIG. 5.)

Figure 7A:
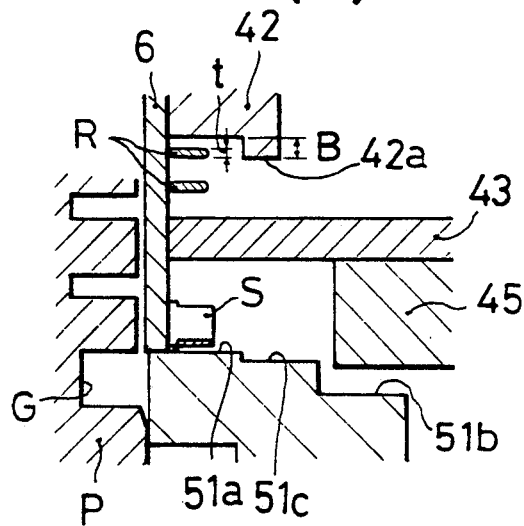
FIG. 7(a) through FIG. 7(e) are diagrams showing assembling procedures in the assembling station.
Figure 7B:
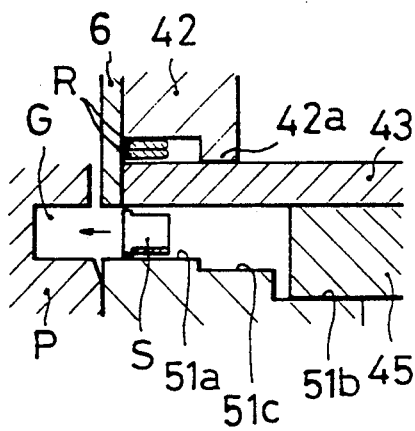

After the piston P has been transported into the assembling station 4, the restricting member 43 is first advanced by moving it radially inwards, thereby interposing the restricting member 43 in the space between the lower-side side rail ring R and the spacer ring S. The sleeve operating plate 45 is changed over to the inward operating position. In this condition, the pushing member 42 is lowered. According to these operations, the lower end surface of the pushing member 42 comes into abutment with the upper-side side rail ring R and, therefore, this ring R and the side rail ring R which lies thereunder are pushed down. At the same time, the abutment piece 42a comes into abutment with the restricting member 43, thereby pushing down the restricting member 43. At this time, the sleeve operating plate 45 is also pushed down together with the restricting member 43, thereby bringing the sleeve operating plate 45 into abutment with the stepped extension portion 51b of the flange 51a at the upper end of the sleeve 51. The sleeve 51 is therefore pushed down to provide such a clearance or space between the flange 51a and the guide member 6 as will face or open into the piston ring groove G. At the same time, as shown in FIG. 7(b), the spacer ring S is pushed out of the lower end of the guide member 6 by means of the restricting member 43 and is assembled into the piston ring groove G. The sleeve 51 is prevented from further lowering because, when the upper surface of the flange 51a has reached the same level as the lower-side groove surface of the piston ring groove G, the lower surface of the flange 51a comes into contact with the upper end of the jig 50.

Figure 7C:
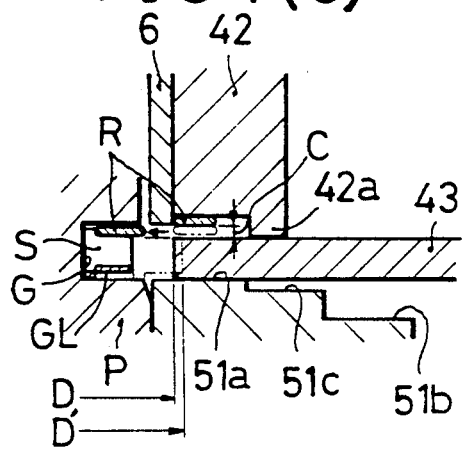

Then, the sleeve operating plate 45 is retreated to the outward clearing position to further lower the pushing member 42. The restricting member 43 is thereby pushed down to the lower end position where it comes into abutment with the flange 51a. If the thickness of the restricting member 43 is determined such that the vertical distance C between the restricting member 43 at the above-described lower end position and the lower end of the guide member 6 becomes $t<C<t+t/2$, the vertical distance between the lower end of the guide member 6 and that abutment surface at the lower end of the pushing member 42 which abuts the upper-side side rail ring R becomes substantially equal to the thickness t of the side rail ring R, in conjunction with the above-described setting of the projecting length B of the abutment piece 42a to $2t<B<2t+t/2$. As a result, only the lower-side side rail ring R will be pushed out of the lower end of the guide member 6. The lower-side side rail ring R will thus be assembled through the clearance between the restricting member 43 and the lower end of the guide member 6 into the groove portion GU on the upper side of the spacer ring S, as shown in FIG. 7(c).

Figure 7D:
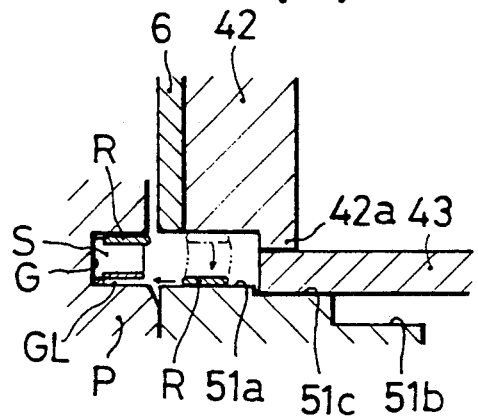
Figure 7E:
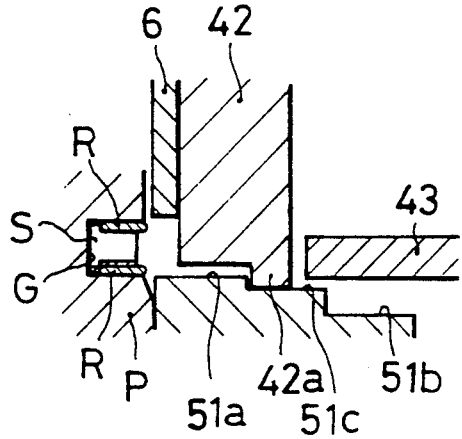
Figure 8A:
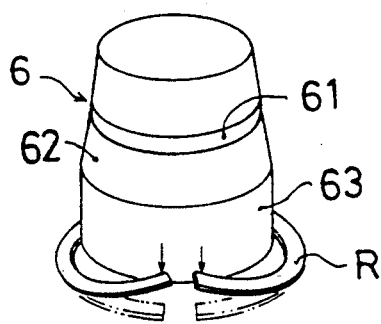
Figure 8B:
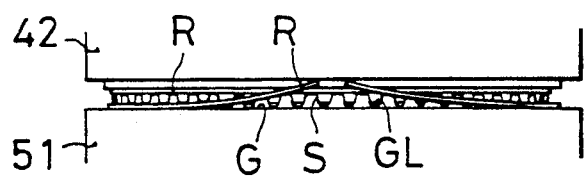
Figure 8C:
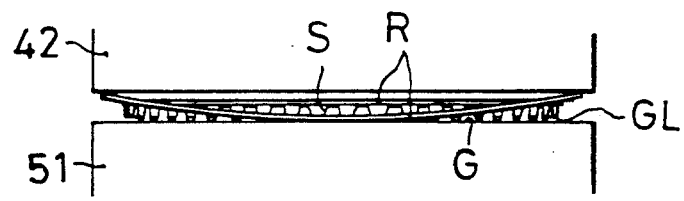

Then, the restricting member 43 is retreated outwards while the pushing member 42 is pressed downwards. According to this operation, the pushing member 42 is slightly lowered when the restricting member 43 has reached the stepped surface 51c which is formed in an external periphery of the flange 51a and, as shown in FIG. 7(d), the upper-side side rail ring R will be pushed out of the lower end of the guide member 6. Here, the upper-side side rail ring R is relieved of the support from the lower side upwards by the restricting member 43 when the restricting member 43 is moved backwards. As a result, the upper-side side rail ring R will undulate as shown in FIGS. 8(a) through 8(c), and those undulated portions which project in a bending manner down below the guide member 6 will reach the position which faces the groove portion GL below the spacer ring S, and will come into abutment with the flange 51a which serves as a second restricting member. Therefore, when the split end portions of the side rail ring R are pushed out of the guide member 6 as a result of slight downward movement of the pushing member 42 as described above, the remaining portion of the side rail ring R is forcibly caused to be pulled, with the undulated portions operating or functioning as origins, into the groove portion GL due to the contracting force and the force of restoring back to the horizontal condition of the side rail ring R. The side rail ring R is thus assembled into the groove portion GL. Once the restricting member 43 is moved outwards off the abutment piece 42a, the pushing member 42 is lowered as shown in FIG. 7(e), thereby finishing the assembling procedures.

In the above-described piston P, the lower edge of the piston ring groove G is tapered. Therefore, even if the flange 51a is lowered to a level below the lower-side groove surface of the ring groove G, it is still possible to assemble the side rail ring R into the groove portion GL. It is thus not necessary to exactly coincide the flange 51a to the same level as the groove surface.

When the side rail ring R is to be assembled into the groove portion GU above the spacer ring S, it sometimes happens that both ends of the split portion S2 of the spacer ring S are pulled towards each other to overlap as a consequence of the contraction of the side rail ring R. Therefore, in the above-described embodiment of the present invention, the following arrangement has been employed. Namely, in a condition shown in FIG. 7(c) in which the side rail ring R is assembled into the groove portion GU, the distance D from the center of the piston to that inner end surface of the restricting member 43 which faces the split portion S2 of the spacer ring S is set to be smaller than the outside diameter D' of the split portion with both ends thereof being overlapped, as shown by imaginary lines in FIG. 7(c). In this manner, both ends of the split portion are prevented by the restricting member 43 from overlapping each other.

Figure 9:
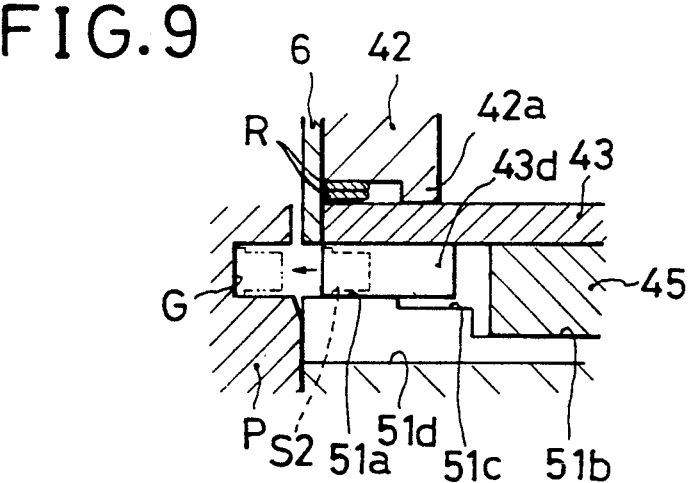
FIG. 9 is a sectional view of a modified example of the restricting member.

Further, when the spacer ring S is assembled, there is a possibility that both ends of the split portion thereof may overlap each other. However, as shown in FIG. 9, there may be provided, in a projecting manner, under the restricting member 43 an engaging piece 43d which engages with the split portion S2 of the spacer ring S. In this arrangement, the spacer ring S is pushed out of the guide member 6 in a condition in which both ends of the split portion S2 are in forced abutment with both side surfaces of the engaging piece 43d. Therefore, together with the above-described setting of D<D', the spacer ring S can be assembled into the piston ring groove G without both ends of the split portion being overlapped. In this arrangement, the flange 51a is provided with a groove or recess 51d which receives the engaging piece 43d.

An explanation has hereinabove been made about an embodiment in which the piston P is transported to the assembling line while the guide member 6 is set in position. In this embodiment, however, it is necessary to manually mount and dismount the guide member 6 into and out of the piston P, respectively, at the starting end and the finishing end of the assembling line as well as to return the guide member 6 dismounted at the finishing end back to the starting end. It has therefore a disadvantage in that the working procedures become troublesome and that many guide members 6 are required, resulting in higher equipment costs.

Figure 10:
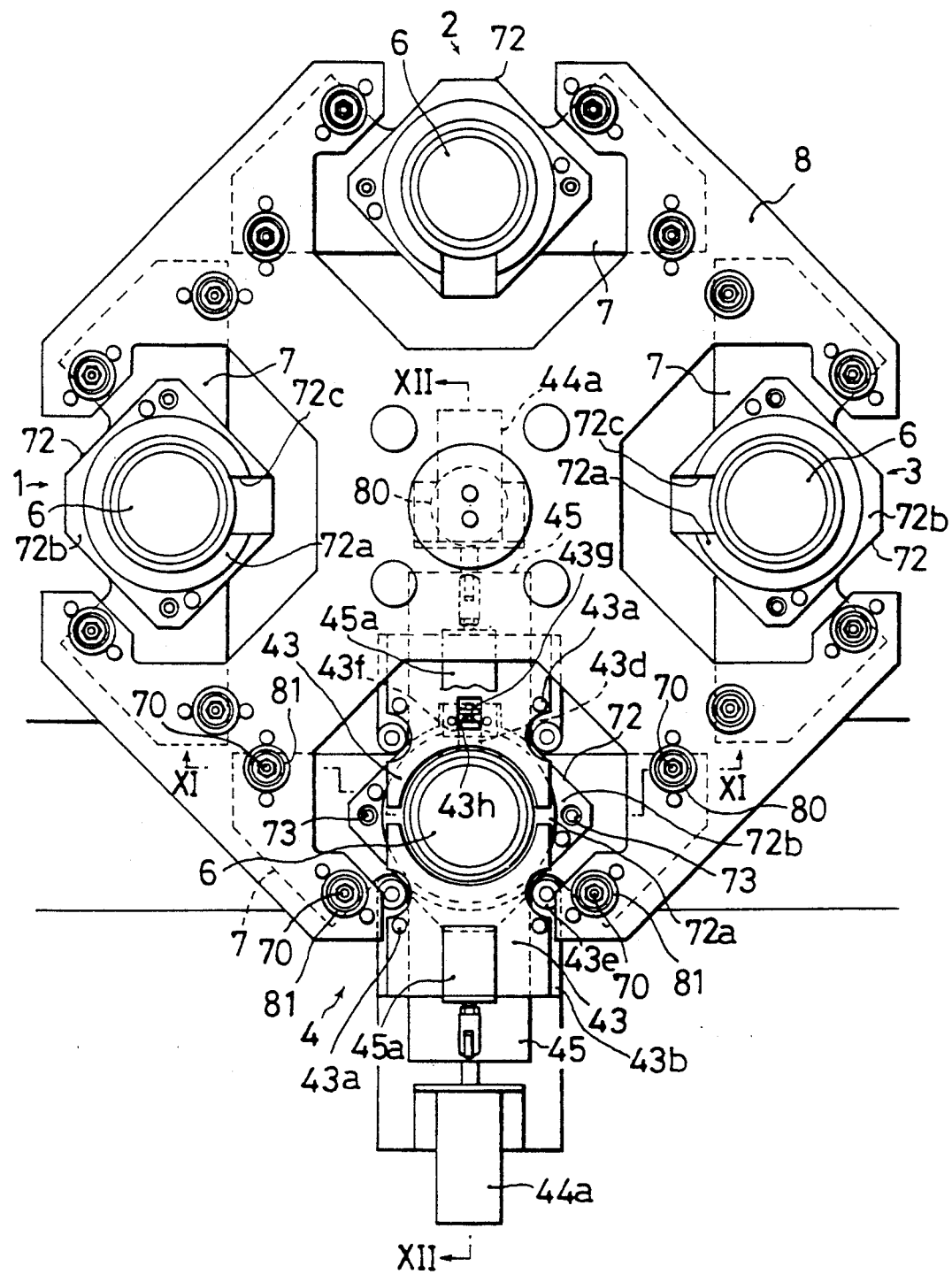
FIG. 10 is a plan view of another embodiment of the present invention.

Therefore, in an embodiment shown in FIG. 10, the following arrangement has been employed. Namely, a spacer ring feeding station 1, a side rail ring feeding station 2, a separating station 3 and a ring assembling station 4 are disposed in a circular manner. Setting jigs 7 for supporting a guide member 6 are provided in four places around a supporting frame 8 to be rotated by index-movement about a shaft 80 in the center of circle of arrangement of the above-described stations. Each setting jig 7 is circulated by the rotation of the supporting frame 8. In each of the feeding stations 1, 2 a spacer ring S and two pieces of side rail rings R are mounted by feeding apparatuses which are similar to those in the above-described embodiment. Then, in the ring separating station 3, the distance between the spacer ring S and the side rail rings R is made larger by a separating apparatus which is similar to that in the above-described embodiment. In the ring assembling station 4, the guide member 6 is set to the piston P. All the steps including the step of setting the guide member 6 are automated so that the assembling work can be carried out efficiently with as small a number of guide members 6 as possible.

Figure 11:
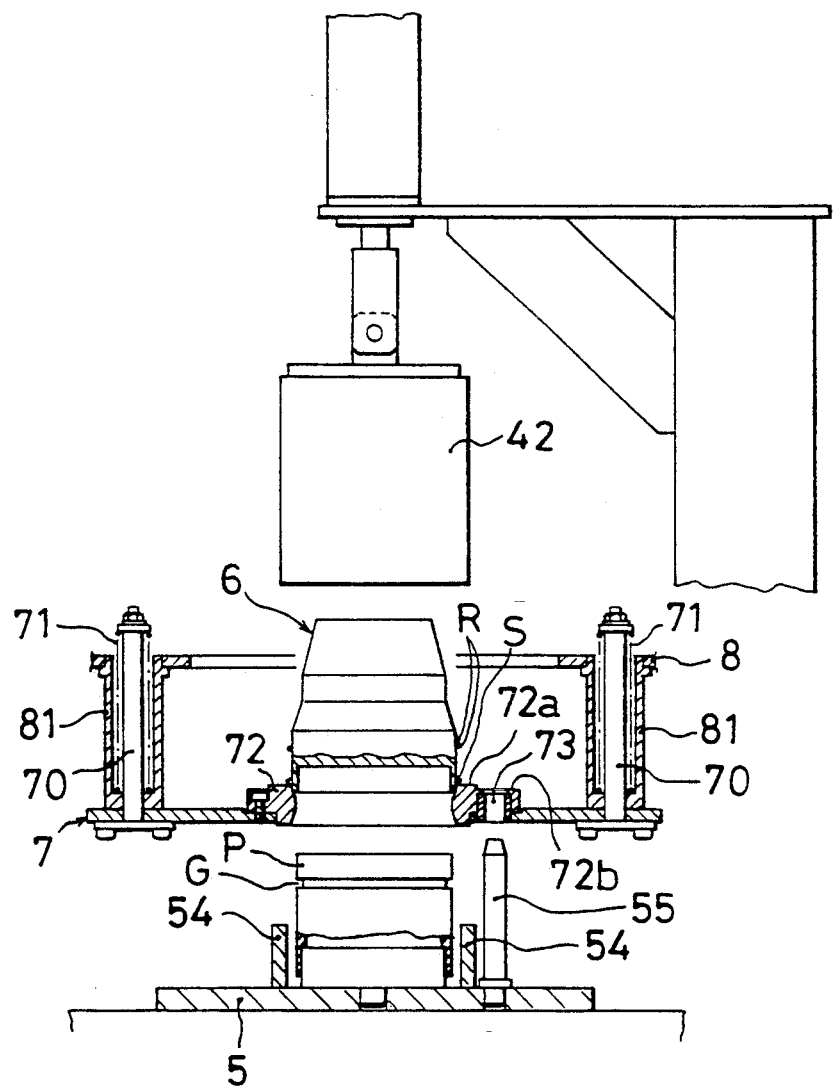
FIG. 11 is a sectional view taken along the line XI—XI in FIG. 10.

In each of the setting jigs 7, there are installed or implanted, as shown in FIG. 11, a plurality of rods 70 to be inserted into a plurality of sleeves 81 which are vertically provided on the supporting frame 8. Each setting jigs 7 is thus supported by the supporting frame 8 in a suspended manner while urging it upwards by springs 71 which are inserted into an outside of each rod 70. Further, in the central portion of each setting jig 7 there is fixedly provided a circular jig main body 72 which can be inserted into the outside of the piston P. A stepped portion for receiving the lower end of the guide member 6 is formed on an inner upper portion of the jig main body 72. On an upper surface of the jig main body 72 there are formed an inner side receiving surface 72a and an outer side stepped portion 72b which is slightly lower than the receiving surface 72a. On a pallet 5 to mount thereon the piston P, there is installed a stopper 54 and a positioning pin 55 for restricting the lower position of the setting jig 7, in place of the jig 50 of the above-described embodiment. The pin 55 is caused to be fitted into a positioning hole 73 which is provided in the jig main body 72 to align the piston P and the jig main body 72. By the lowering of the setting jig 7 the jig main body 72 is thus securely inserted into the outside of the piston P.

Figure 12A:
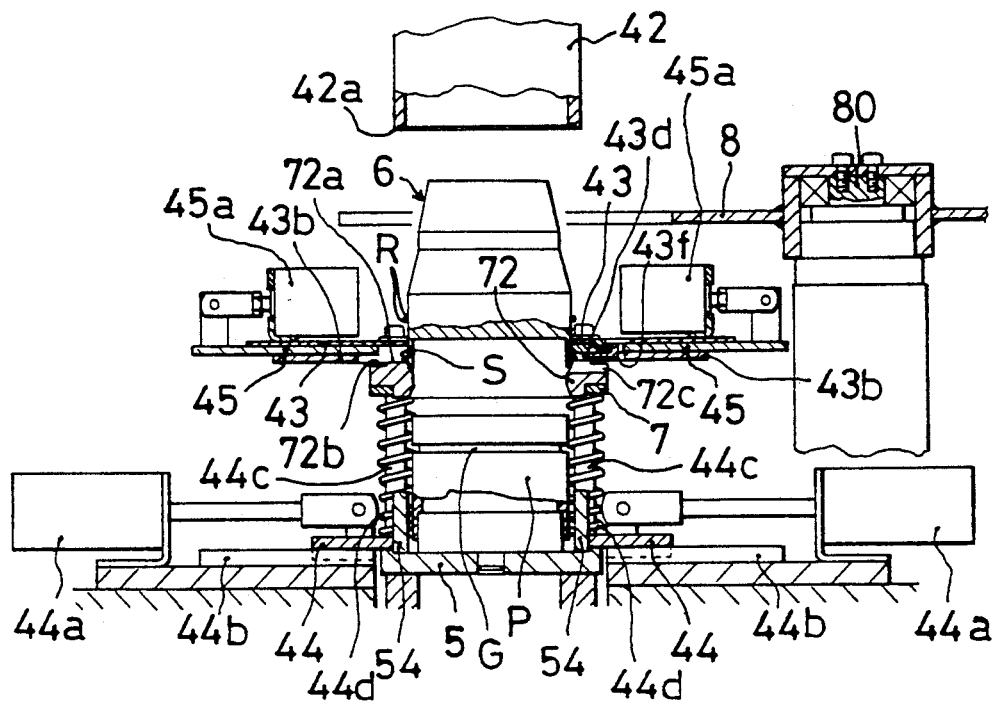

In the assembling station 4 there are provided, as shown in FIG. 12, a pushing member 42 and a pair of restricting members 43, 43 which are similar to those in the above-described embodiment. When the pushing member 42 is lowered in a condition in which the restricting members 43 are urged, through the operation of cylinders 44a, against that peripheral portion of the guide member 6 on the setting jig 7 which lies between the spacer ring S and the side rail rings R, thereby lowering the restricting members 43 via an abutting piece 42a formed at a lower end of the pushing member 42, an operating plate 45 under the restricting member 43 abuts the stepped surface 72b of the jig main body 72 and consequently the setting jig 7 is lowered against the springs 71. In this embodiment, the cylinders 45a for the operating plate 45 are provided on the restricting members 43.

Figure 12B:
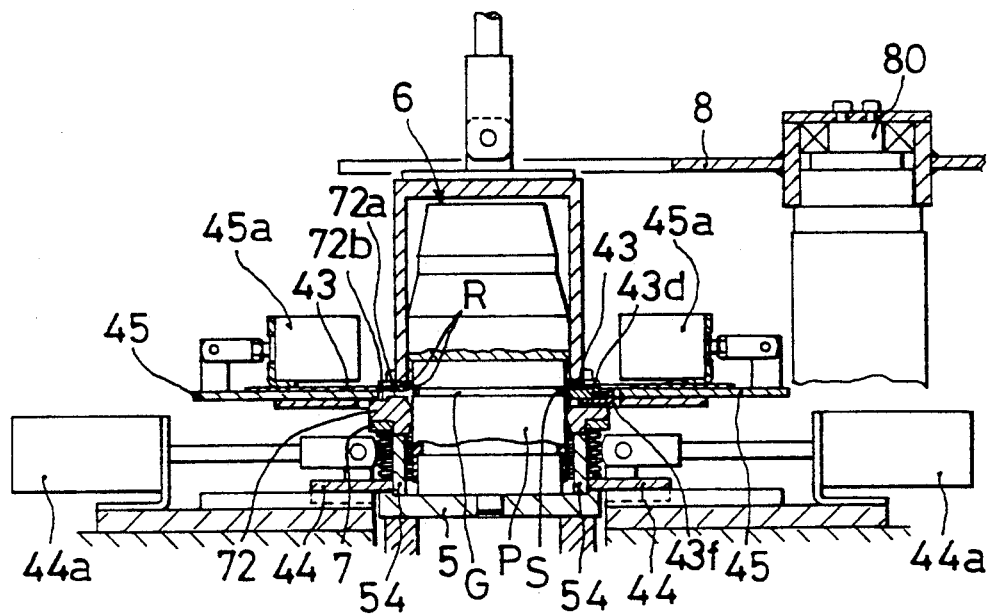

When the setting jig 7 is lowered as described above, the jig main body 72 is externally inserted onto the piston P, and the guide member 6 on the jig main body 72 is set onto the piston P. By the further lowering of the setting jig 7, there will be provided a clearance which faces or opens into the piston ring groove G, as shown in FIG. 12(b), between the receiving surface 72a of the jig main body 72 and the lower end of the guide member 6. At the same time, the spacer ring S is pushed out of the guide member 6 by the restricting member 43 and is thus assembled into the ring groove G.

Here, when the setting jig 7 is lowered until the receiving surface 72a becomes equal in level to the lower-side groove surface of the piston ring groove G, further lowering is restricted by the stopper 54. Thereafter, like in the above-described embodiment, through the operation of the cylinders 45a, the operating plates 45 are retreated to the outside of the stepped surface 72b. The restricting members 43 are lowered until they seat on the receiving surface 72a. The lower-side side rail ring R is pushed out of the guide member 6 to assemble it into the upper-side groove portion. Then, the restricting members 43 are retreated towards the side of the stepped surface 72b, and the upper-side side rail ring R is pushed out of the guide member 6 to assemble it into the groove portion below the spacer ring S.

After the rings have been assembled, the restricting members 43 are retreated to the outside of the jig main body 72 and also the pushing member 42 is lifted. According to these procedures, the setting jig 7 is moved up by the spring 71, the stepped portion on the inner upper portion of the jig main body 72 engages with the lower end of the guide member 6, and the guide member 6 is lifted so as to be detached from the piston P. In this condition, the assembled piston P is discharged from the assembling station 4 to feed the next piston P into the assembling station 4. At the same time, the supporting frame 8 is rotated to move the next setting jig 7 from the separating station 3 to the assembling station 4. The assembling of the set oil ring is carried out in the same procedure as described above.

Figure 13:
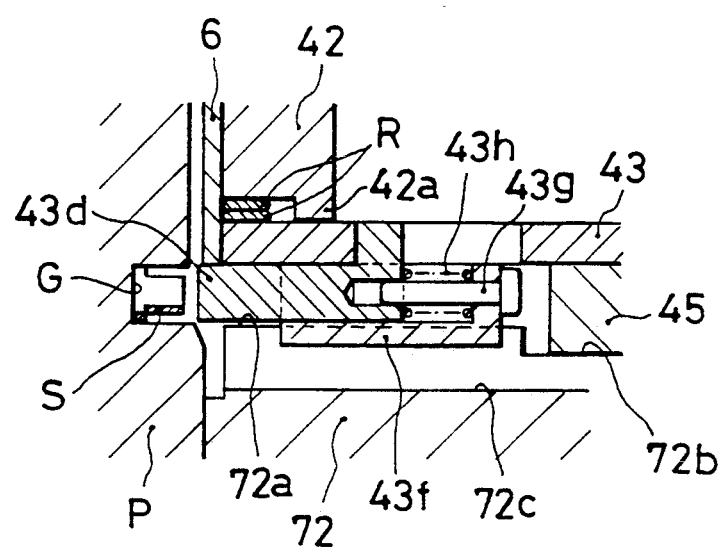
FIG. 13 is an enlarged sectional view of an attaching portion of an engaging piece which is engaged into both ends of the split portion of the spacer ring.

In this embodiment, an engaging piece 43d which engages into the split end of the spacer ring S is provided, as shown in FIG. 13, so as to be slidable in a pocket portion 43f provided at the lower surface of one of the restricting members 43 as well as to be urged inwards by a spring 43h which is inserted into the outside of a guide pin 43g. At the time when the spacer ring S is pushed out, the engaging piece 43d projects inwards at the lower end of the guide member 6. Both ends of the split portion of the space ring S are guided by the engaging piece 43d up to a position as close to the piston ring groove G as possible so that the overlapping of both ends of the split portion is surely prevented at the time of assembling the spacer ring S. On the upper surface of the jig main body 72, there is formed a clearing groove or dent 72c which receives the pocket portion 43.

It is readily apparent that the above-described method of assembling a piston ring, a method of assembling a set oil ring and an apparatus for assembling a set oil ring meet all of the objects mentioned above and also have the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for assembling a set oil ring into a piston ring groove of a piston, the set oil ring comprising a spacer ring and a pair of side rail rings to be placed on both sides of the spacer ring, said apparatus comprising:
   a guide member which is larger in diameter than an outside diameter of the piston, a front end of said guide member being able to be positioned relative to the piston into a predetermined positional relationship with the piston ring groove, said guide member being able to mount on an outside thereof the spacer ring and the pair of side rail rings such that the spacer ring is positioned in a foremost side towards the front end of said guide member, followed by the pair of side rail rings;
   pushing means for pushing, in sequence out of the front end of said guide member, the spacer ring and the pair of side rail rings; and
   a restricting member which is movable back and forth in a radial direction relative to said guide member and which can be placed, relative to the front end of said guide member, with a clearance to be formed to open into that groove portion which is formed between that groove surface of the piston ring groove which is closer to said guide member and the spacer ring assembled into the piston ring groove.

2. An apparatus for assembling a set oil ring according to claim 1, wherein said restricting member is movable in an axial direction of said guide member and is insertable into a space between the spacer ring and the front-side side rail ring which lies on the front side, out of the pair of side rail rings, and wherein said pushing means is made up of a pushing member and said restricting member, said pushing member abutting the rear-side side rail ring which lies on the rear side, out of the pair of side rail rings, and being movable in the axial direction of said guide member.

3. An apparatus for assembling a set oil ring according to claim 2, wherein said restricting member is urged rearwards in the axial direction of said guide member, and wherein one of said restricting member and a front end of said pushing member is provided, in a projecting manner, with an abutment piece which abuts the other thereof, whereby said restricting member is pushed by said pushing member forwards in the axial direction of said guide member.

4. An apparatus for assembling a set oil ring according to claim 3, wherein the following conditions are satisfied:

$$0 \leq A < t/2 \text{ and } 2t < B < 2t + t/2$$

where A is a distance in the axial direction between the front end of said guide member and that groove surface of the piston ring groove which is closer to said guide member, B is the projecting length of said abutment piece, and t is a thickness of the side rail ring.

5. An apparatus for assembling a set oil ring according to claim 1, wherein a radially inner surface of said restricting member, in a condition in which it faces the front end of said guide member while maintaining said clearance, faces both ends of a split portion of the spacer ring assembled into the piston ring groove, and wherein the distance from a center of the piston to the radially inner surface of said restricting member is made smaller than an outside diameter of the split portion with both ends thereof being overlapped.

6. An apparatus for assembling a set oil ring according to claim 5, further comprising an engaging piece which is provided in that surface of said restricting member which faces axially forward of said guide member, said engaging piece being arranged to engage into the clearance between both ends of the split portion of the spacer ring which is mounted on said guide member.

7. An apparatus for assembling a set oil ring according to claim 1, further comprising a second restricting member which is provided on substantially a same level as the groove surface which lies away from the front end of said guide member, said second restricting member receiving the rear-side side rail ring which is pushed out of said guide member.

8. An apparatus for assembling a set oil ring according to claim 1, further comprising a setting jig which can be externally inserted onto, and withdrawn out of, the piston for supporting said guide member and setting said guide member onto the piston and wherein said setting jig is arranged to be circulated among a spacer ring feeding station, a side rail ring feeding station, and an assembling station in which said pushing means and said restricting member are disposed.

9. An apparatus for assembling a set oil ring according to claim 8, wherein said setting jig is supported by a supporting frame which is circulated among said spacer ring feeding station, said side rail ring feeding station, and said assembling station, said setting jig being supported in a manner to be urged away from the piston, and wherein said setting jig is pushed by said pushing means towards the piston to thereby set said guide member onto the piston.

* * * * *